US012518227B2

(12) United States Patent
Gadoury et al.

(10) Patent No.: US 12,518,227 B2
(45) Date of Patent: Jan. 6, 2026

(54) ONLINE DATA VALIDATION

(71) Applicant: ADP, Inc., Roseland, NJ (US)

(72) Inventors: Dominic Gadoury, New York, NY (US); Merajuddin Mohammad, Roseland, NJ (US)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 19/005,485

(22) Filed: Dec. 30, 2024

(65) Prior Publication Data

US 2025/0209392 A1    Jun. 26, 2025

Related U.S. Application Data

(63) Continuation of application No. 17/651,518, filed on Feb. 17, 2022, now Pat. No. 12,182,740.

(51) Int. Cl.
| | | |
|---|---|---|
| G06F 16/00 | (2019.01) | |
| G06F 16/338 | (2019.01) | |
| G06F 16/93 | (2019.01) | |
| G06Q 10/0631 | (2023.01) | |
| G06Q 10/1053 | (2023.01) | |

(52) U.S. Cl.
CPC ... *G06Q 10/063112* (2013.01); *G06F 16/338* (2019.01); *G06F 16/93* (2019.01); *G06Q 10/1053* (2013.01)

(58) Field of Classification Search
CPC ..................................................... G06F 16/93
See application file for complete search history.

(56) References Cited

U.S. PATENT DOCUMENTS

| | | |
|---|---|---|
| 2018/0218121 A1 | 8/2018 | Gassner et al. |
| 2020/0126663 A1 | 4/2020 | Lucas et al. |

OTHER PUBLICATIONS

US Notice of Allowance issued in corresponding U.S. Appl. No. 17/651,518, dated Aug. 20, 2024 (8 pages).
US Office Action issued in corresponding U.S. Appl. No. 17/651,518, dated Dec. 7, 2023 (11 pages).

*Primary Examiner* — Ajith Jacob
(74) *Attorney, Agent, or Firm* — Foley & Lardner LLP

(57) ABSTRACT

A method, apparatus, system, and computer program product provide visual verification of electronic data. The computer system comprises a hardware processor and a data verifier in communication with the hardware processor. The data verifier is configured to execute program code for: receiving a request to verify data listed in an electronic document; determining a set of a characteristics about the data; determining, from the characteristics, an endpoint for a data steward that maintains data records about the data; generating a query from the data; forwarding the query to the endpoint that was determined; in response to receiving a query response, determining whether the query response matches the data; and in response to determining that the query response matches the data, sending a verification of the data.

20 Claims, 7 Drawing Sheets

ONLINE DATA VALIDATION

CROSS-REFERENCE TO RELATED PATENT APPLICATIONS

This application claims the benefit of and priority to, under 35 U.S.C. § 120, U.S. Non-Provisional patent application Ser. No. 17/651,518, filed Feb. 17, 2022, issuing as U.S. Pat. No. 12,182,740 on Dec. 31, 2024, which is hereby incorporated herein by reference in its entirety.

BACKGROUND INFORMATION

Field

The present disclosure relates generally to an improved system and method, which can be embodied in an apparatus, computer system, or computer program product, for providing visual verification of electronic data.

Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

The information systems may be used in performing operations for an organization. The operations may include hiring operations and project assignments.

For example, in filling a position in an organization, requirements for the position are identified as part of the process. The position may be filled from within the organization or by hiring someone from outside of the organization.

As another example, in assigning people to projects, various characteristics about the people may be used to identify who is most suited for different projects. The characteristics may include, for example, skills and experience that may be considered to identify people with the skills needed for a project.

A search in one or more databases in one or more information systems may be made to identify information about characteristics for people who may be suitable for a particular project. The search may return performance reviews, prior project assignments, emails, publications, tenure at the organization, and other information about people in the organization that may be used to identify who may be assigned to a project.

In filling a position, skills that are desired for the position may be identified from searching one or more information systems. Searching one or more information systems may identify information about characteristics that may be desirable for the position. For example, information about skills for people in the same or similar positions may be reviewed, as well as skills and experience of those people garnered from their previous experiences.

As part of identifying prospective candidates to fill a position, information systems including online profiles of the candidates may also be searched. However, because these profiles are created by the people themselves, organizations lack the resources to quickly determine the truthfulness of assertions made in these profiles by prospective candidates. An organization may use a third-party search firm to verify aspects of the profile, these searches represent an additional expense to the organization, and are therefore not to be performed as part of a first pass of the candidates. The results of a search for prospective candidates may be inaccurate, unverifiable, and more time-consuming than desired.

Therefore, it would be desirable to have a method and apparatus that take into account at least some of the issues discussed above, as well as other possible issues. For example, it would be desirable to have a method and apparatus that overcome a technical problem of verifying employment history asserted in an online profile that make identifying qualified people more cumbersome and time-consuming than desired.

SUMMARY

According to one embodiment of the present invention, a computer system comprises a hardware processor and a data verifier in communication with the hardware processor. The data verifier is configured to execute program code for: receiving a request to verify data listed in an electronic document; determining a set of a characteristics about the data; determining, from the characteristics, an endpoint for a data steward that maintains data records about the data; generating a query from the data; forwarding the query to the endpoint that was determined; in response to receiving a query response, determining whether the query response matches the data; and in response to determining that the query response matches the data, sending a verification of the data.

Another embodiment of the present disclosure provides a method for providing verification of electronic data. The method includes the steps of: receiving a request to verify data listed in an electronic document; determining a set of a characteristics about the data; determining, from the characteristics, an endpoint for a data steward that maintains data records about the data; generating a query from the data; forwarding the query to the endpoint that was determined; in response to receiving a query response, determining whether the query response matches the data; and in response to determining that the query response matches the data, sending a verification of the data.

According to yet another embodiment of the present invention, a computer program product comprises a computer-readable storage media with program code stored on the computer-readable storage media for providing verification of electronic data. The program code is executable by a computer system to perform a method of: receiving a request to verify data listed in an electronic document; determining a set of a characteristics about the data; determining, from the characteristics, an endpoint for a data steward that maintains data records about the data; generating a query from the data; forwarding the query to the endpoint that was determined; in response to receiving a query response, determining whether the query response matches the data; and in response to determining that the query response matches the data, sending a verification of the data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that information is stored in electronic documents. The illustrative embodiments also recognize and take into account that verifying the truthfulness of assertions made in these documents may be more cumbersome and time-consuming than desirable.

Thus, the illustrative embodiments provide a method, apparatus, and computer program product for graphically displaying a verification of data in an electronic document. The verification system includes techniques that facilitate identifying and displaying verification information dynamically generated from trusted data stewards. Verification techniques of the verification system may be applied to a wide variety of data types that may be gathered from a plurality of data sources existing across disparate devices, networks and in the cloud.

Figure 1:
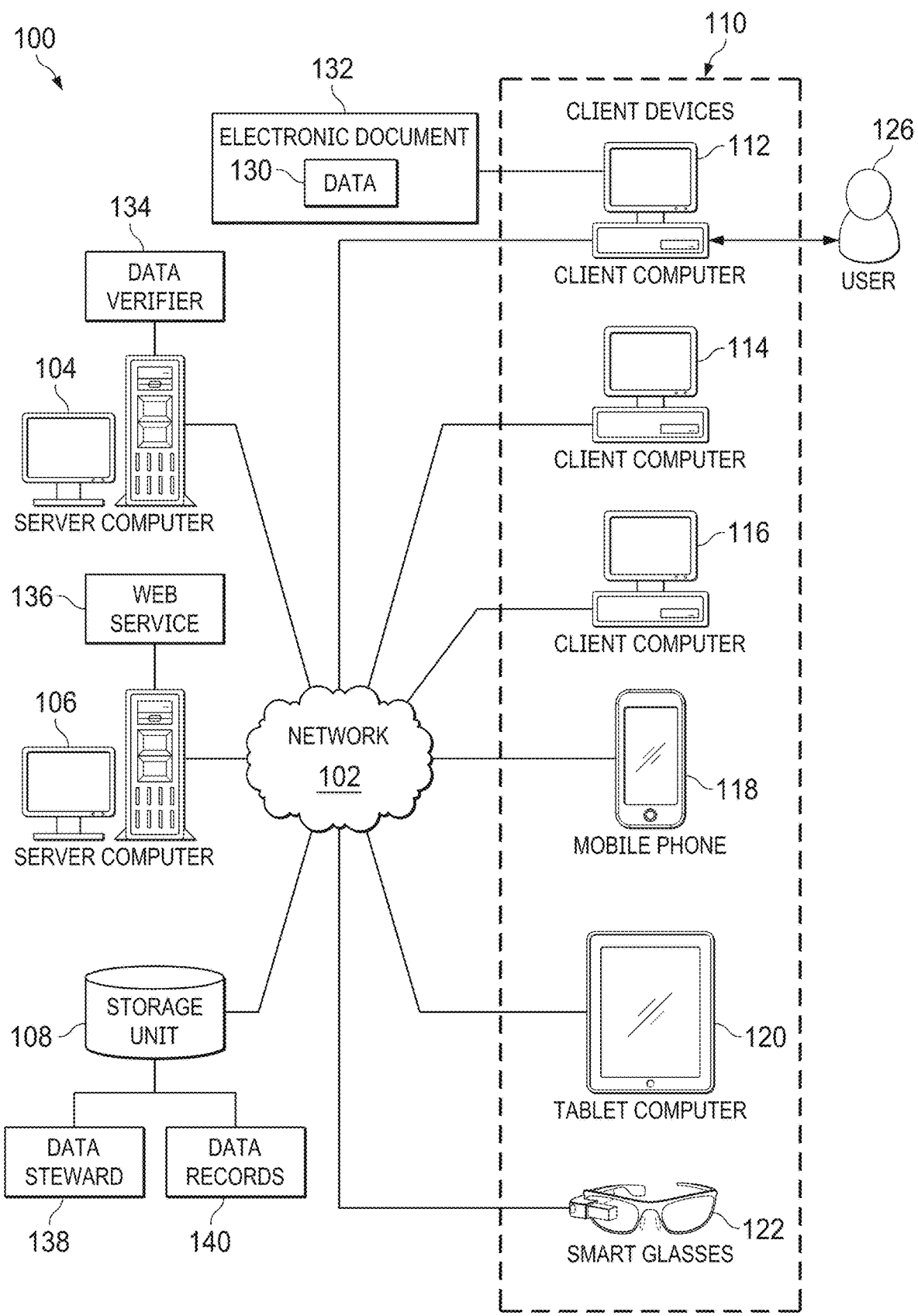
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 126 operates client computer 112 to submit electronic document 132 to web service 136. Either of user 126 or web service 136 can request verification of data 130 asserted in an electronic document 132. In the illustrative example, data verifier 134 can verify data 130 in response to receiving user input from user 126, or in response to receiving a request from web service 136.

In this illustrative example, user 126 submits electronic document 132 using client computer 112. The access can be performed by user 126 interacting with a browser at client computer 112. In this illustrative example, the browser is a software application for accessing information on network data processing system 100. For example, the browser can retrieve content from a server computer such as server computer 104 and display the information on client computer 112. In this illustrative example, the browser can be, for example, a web browser.

In this illustrative example, data verifier 134 can run on server computer 104. In another illustrative example, data verifier 134 can be run in a remote location such as on client computer 114 and can take the form of a system instance of the application. In yet other illustrative examples, data verifier 134 can be distributed in multiple locations within network data processing system 100. For example, data verifier 134 can run on client computer 112 and on client computer 114 or on client computer 112 and server computer 104 depending on the particular implementation.

Data verifier 134 parses electronic document 132 to determine characteristics about data 130. Based on the determined characteristics, data verifier 134 determines a data steward 138 that maintains data records 140 corresponding to data 130 asserted in electronic document 132. Determining characteristics of data 130, enables data verifier 134 to determine data steward 138 that maintains a corresponding set of data records from a limited amount of data listed in the electronic document. For example, in one illustrative example, the characteristics of data 130 may include a linguistic format, such as an alphanumeric pattern. By determining this linguistic format, data verifier 134 can determine whether a particular data steward is likely to maintain corresponding data records.

In the illustrative example in this figure, data verifier 134 receives a request to verify data 130 listed in an electronic document 132. Data verifier 134 then determines a set of a characteristics about the data 130. Based on the determined characteristics, data verifier 134 determining an endpoint for a data steward 138 that maintains data records 140 about the data 130. Data steward 138 generate a query from data 130 and forwards the query to the endpoint that was determined. Upon receiving a query response from data steward 138, data verifier 134 sends a verification of the data when the query response matches the data 130.

Further, because data verifier 134 is capable of determining an appropriate data steward data based on characteristics of the submitted data, data verification systems that include data verifier 134 overcome a technical problem of verifying electronic data, including verifying unsubstantiated assertions in an electronic document. In one illustrative example, because appropriate endpoints are determined automatically, data verifier 134 enables verification of data more quickly and easily, eliminating the need for manual searching of multiple databases by user 126.

Figure 2:
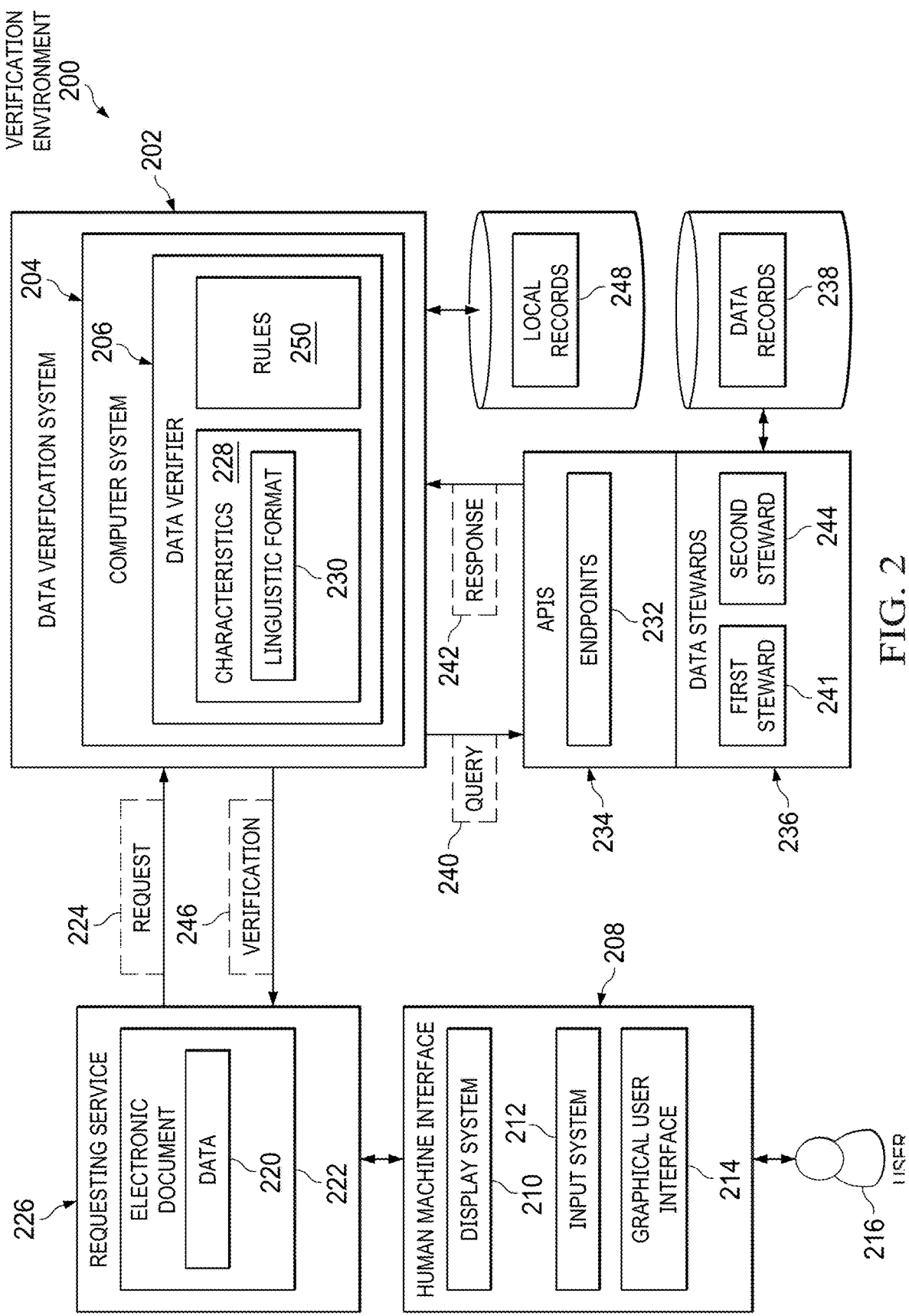
FIG. 2 is a block diagram of a verification environment in accordance with an illustrative embodiment.

With reference now to FIG. 2, a block diagram of a verification environment is depicted in accordance with an illustrative embodiment. In this illustrative example, verification environment 200 includes components that can be implemented in hardware such as the hardware shown in network data processing system 100 in FIG. 1.

As depicted, verification environment 200 is an environment in which data verifier 206 enables data verification system 202 in computer system 204 to provide services for providing visual verification of data 220 in electronic document 222.

Computer system 204 is a physical hardware system and includes one or more data processing systems. When more than one data processing system is present in computer system 204, those data processing systems are in communication with each other using a communications medium. The communications medium may be a network. The data processing systems may be selected from at least one of a computer, a server computer, a tablet, or some other suitable data processing system.

In this illustrative example, data verifier 206 and computer system 204 form data verification system 202. In enabling data verification system 202 to provide services, data verifier 206 can perform identification and substantiation of assertions made in electronic documents for use in providing visual verification of electronic data by data verification system 202.

Data verifier 206 can be implemented in software, hardware, firmware, or a combination thereof. When software is used, the operations performed by data verifier 206 can be implemented in program code configured to run on hardware, such as a processor unit. When firmware is used, the operations performed by data verifier 206 can be implemented in program code and data and stored in persistent memory to run on a processor unit. When hardware is employed, the hardware may include circuits that operate to perform the operations in data verifier 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 is a person that can interact with graphical user interface 214 through user input generated by input system 212. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, data verifier 206 receives a request 224 to verify data 220 listed in an electronic document 222. As depicted, data verifier 206 receives request 224 from requesting service 226. Requesting service 226 can be a website, web service, or web-based application that manages electronic documents, such as electronic document 222.

In this illustrative example, data verifier 206 determines a set of a characteristics 228 about the data 220. Characteristics 228 may include a linguistic format 230 of the data 220. As used herein, the term "linguistic format" refers to a generalized pattern of alphanumeric or symbolic characters. As opposed to a file type or data type, a linguistic format 230 refers to a patterned arrangement of characters or strings within data 220.

In this illustrative example, data verifier 206 determines endpoints 232 based on the characteristics 228.

Endpoints 232 are the ends of a communication channel. When an API, such as APIS 234, interacts with another system, such as data stewards 236, the touchpoints of this communication are endpoints. For example, each of endpoints 232 in APIs 234 can include a URL of a server or service, such as one of data stewards 236. APIs 234 accesses resources from data stewards 236 through a corresponding endpoint.

API, or application programming interface, is a set of rules that define how applications or devices can connect to and communicate with each other. APIs 234 can be a RESTful API that conforms to the design principles of the representational state transfer architectural style.

Each of endpoints 232 is corresponds to a data stewards 236. As used here in, a "data steward" is a system or service that maintains data records 238 about the data 220. For example, data 220 may correspond to a data dimension in data records 238 that are maintained by data stewards 236.

In this illustrative example, data verifier 206 generates a query 240 from the data 220 and forwards the query 240 to the endpoint 232 that was determined. Query 240 can be a structured query language (SQL) or JavaScript object notation (JSON) object generated from and including data 220. Data verifier 206 can then forward query 240 to the endpoint 232 in a RESTful request message.

In one illustrative example, data verifier 206 determines a set of endpoints 232 for data stewards 236 by applying a set of rules 250 to characteristics 228 of data 220. For example, data records 238 maintained by different data stewards 236 have unique characteristics. For example, linguistic format 230 can be a unique linguistic format or semi-unique linguistic format. Rules 250 may map data 220 to one or more endpoints 232 according to a linguistic format 230 that was determined for data 220. data verifier 206 may access a listing or registry of organizations mapped to one or more associated APIs for retrieving records of the organization. Data verifier 206 sends the request based on the mapping.

In one illustrative example, a first one of APIs 234 may restrict access to data records 238 that are maintained by data stewards 236.

In response to determining that access to the data records 238 maintained by a first steward 241 is restricted by an APIs 234 that requires information not included in the data 220, data verifier 206 may determine an endpoint 232 for a second steward 244. Second steward 244 Is a data steward that does not prohibit access to data records 238 based information does not present in data 220.

For example, a second one of APIs 234 corresponding to second steward 244 may not require a user's login information, sensitive personal information, or uniquely identifying information in order to access data records 238. Alternatively, data records 238 maintained by second steward 244 may not include sensitive personal information, or uniquely identifying information, the disclosure of which may be restricted or prohibited. For example, data records 238 maintained by second steward 244 may be a data set purchased from primary steward, from which sensitive information has been redacted.

In response to receiving query 240, data steward 236 performs a search of data records 238. If a search of data records 238 that are relevant to query 240, data steward 236 generates a query response 242 that returns the requested data records 238 to data verifier 206.

In this illustrative example, when a query response 242 is received, data verifier 206 determines whether the query response 242 matches the data 220. Data verifier 206 sends a Verification 246 back to the requesting service 226 when the query response 242 matches the data 220.

In one illustrative example, query response 242 may be insufficient to match data 220 in electronic document 222. For example, data records 238 retrieved from second steward 244 may contain different dimensions of data than data 220 of electronic document 222. Data verifier 206 may cross-reference query response 242 with local records 248 to identify common entities. Local records 248 may have include different dimensions of data than query response 242. Data verifier 206 may then supplement query response 242 with local records 248 to verify data 220.

For example, in response to receiving a query response from the secondary steward, data verifier 206 determines whether the query response 242 matches a set of local records 248. In response to determining that the query response matches local records, data verifier 206 determines whether the set of local records matches the data 220 in electronic document 222. In response to determining that the set of local records 248 matches the data, Data verifier 206 determines that the query response 242 matches the data 220.

In this illustrative example, in response to determining that the query response 242 matches the data 220, data verifier 206 sends a Verification 246 of the data 220. Verification 246 may be a graphical image attesting to a veracity of the data 220. When sent to requesting service 226, Verification 246 can be displayed on graphical user interface 214 as a visual confirmation of the veracity of data 220.

Data verifier 206 generates Verification 246 at a level of granularity consistent with the display of data 220 in electronic document 222. In this manner, different data within electronic document 222 can be individually identified with a separate verification 246.

Endpoint 232 In one illustrative embodiment, data verifier 206 dynamically generates verification 246 in response to receiving requests 224. In this illustrative example, data verifier 206 can therefore generate verification 246 that includes a timestamp indicating a date and time of day for the creation of verification 246. The timestamp is a sequence of characters or encoded information that identifies a time at which verification 246 is created by data verifier 206.

In this illustrative example, data verifier 206 enables requesting service 226 to transform the electronic document 222 such that the verification 246 is displayed association with the data 220. For example, requesting service 226 can alter one or more of a document object model (DOM) and a cascading style sheet (CSS) created from one or more JavaScript object notation (JSON) objects or hypertext markup language (HTML) objects accessed to display electronic documents 222. In this illustrative example, the DOM or CSS is transformed to include a reference to.

Data verifier 206 uses Verification 246 to provide visual verification of electronic data asserted in electronic document 222. Further, because verification 246 provides visual verification of data 220 in electronic document 222 based on actual data records 238 maintained by data stewards 236, a verification system that includes data verifier 206 overcomes a technical problem of verifying electronic data, including verifying unsubstantiated assertions in an electronic document.

In one illustrative example, one or more technical solutions are present that overcome a technical problem of verifying electronic data. As a result, one or more technical solutions can provide a technical effect of provides visual verification of data 220 in electronic documents 222.

In this manner, computer system 204 of FIG. 2 can be configured to perform at least one of the steps, operations, or actions described in the different illustrative examples using software, hardware, firmware, or a combination thereof. As a result, computer system 204 operates as a special purpose computer system in which data verifier 206 in computer system 204 enables the visual verification of electronic data. In particular, data verifier 206 transforms computer system 204 into a special purpose computer system as compared to currently available general computer systems that do not have data verifier 206.

In the illustrative example, the use of data verifier 206 in computer system 204 integrates processes into a practical application for providing visual verification of electronic data in a manner that increases the performance of computer system 204. In other words, data verifier 206 in computer system 204 is directed to a practical application of processes integrated into data verifier 206 in computer system 204 that provides visual verification of data in electronic documents substantiated by data records maintained by an independent data steward. Further, data verifier 206 in computer system 204 enables verification of data more quickly and easily as compared to current computer systems that do use data verifier 206. Data verifier 206 in computer system 204 reduces or eliminating the need for manual searching of multiple databases by a user.

The illustration of verification environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
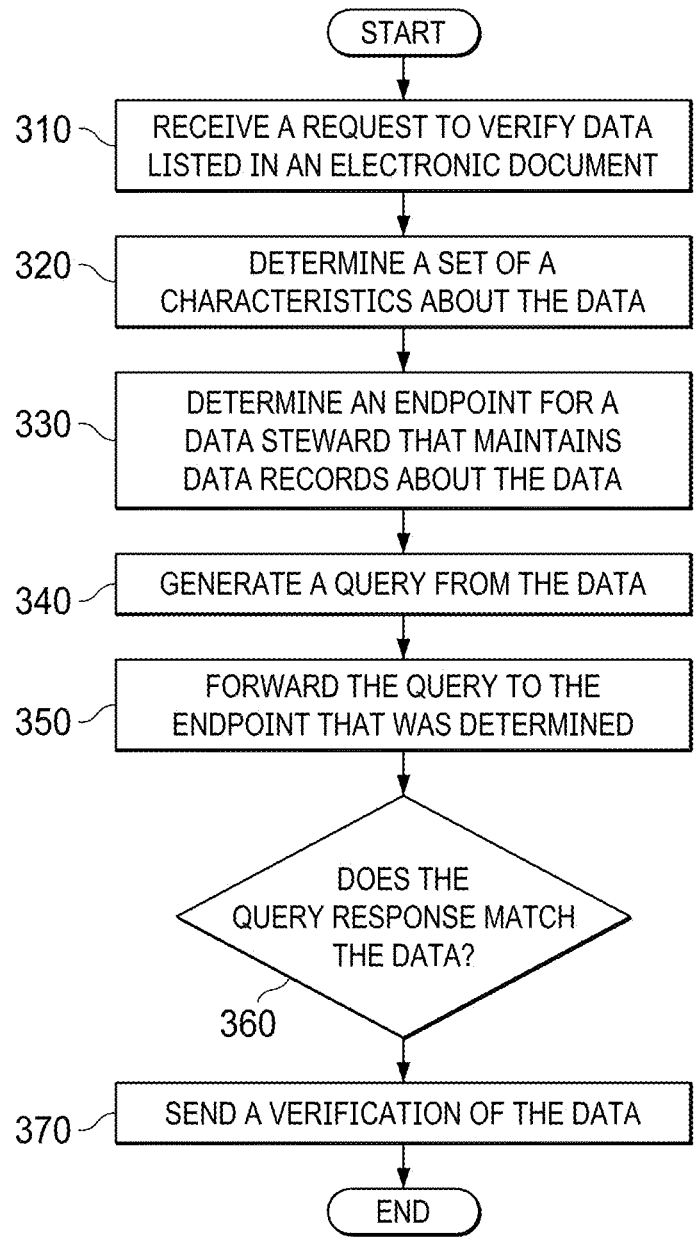
FIG. 3 a flowchart of a process for providing verification of electronic data in accordance with an illustrative embodiment.

Turning next to FIG. 3, a flowchart of a process for providing verification of electronic data is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in data verifier 206 in computer system 204 in FIG. 2.

The process begins by receiving a request to verify data listed in an electronic document (step 310). In one particular use case, the electronic document may comprise a resume or job application, and the data may include an employment history, a position, a job title, an education history, a certification, a credential, a license, a badge, a skill, and an achievement.

The process determining a set of a characteristics about the data (step 320). In one illustrative example, the set of characteristics may include a linguistic format of the data listed in the electronic document.

The process determines an endpoint for a data steward that maintains data records about the data (step 330). The endpoint may be determined based on the characteristics about the data. For example, the process may access a listing or registry of data characteristics mapped to one or more associated API endpoints for retrieving records formatted according to the determined characteristics. The process generates a query from the data (step 340) and forwards the query to the endpoint that was determined (step 350).

In response to receiving a query response, the process determines whether the query response matches the data (step 360). in response to determining that the query response matches the data ("yes" at 360), the process sends a verification of the data to a requesting service (step 370). The process terminates thereafter.

Figure 4:
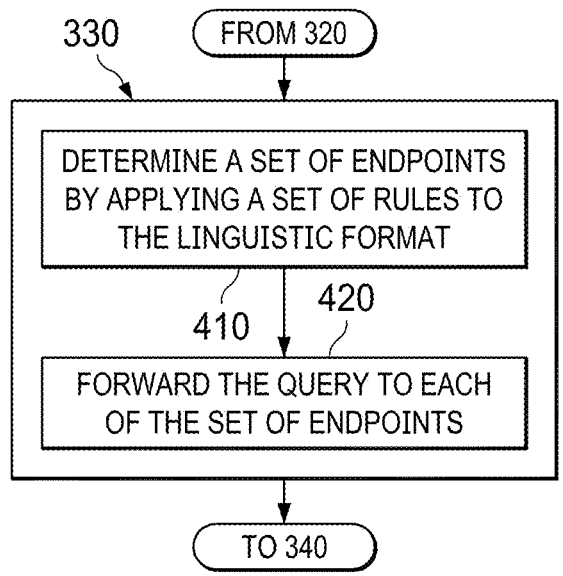
FIG. 4 is a flowchart of a process for determining an endpoint in accordance with an illustrative embodiment.

Turning next to FIG. 4, a flowchart of a process for determining an endpoint is depicted in accordance with an illustrative embodiment. The process in FIG. 4 is an example of one manner in which step 330 in FIG. 3 can be implemented.

Continuing from step 320, the process determines a set of endpoints by applying a set of rules to the linguistic format (step 410). The process forwards the query to each of the set of endpoints (step 420). Thereafter, the process may continue to step 340 of FIG. 4.

Figure 5:
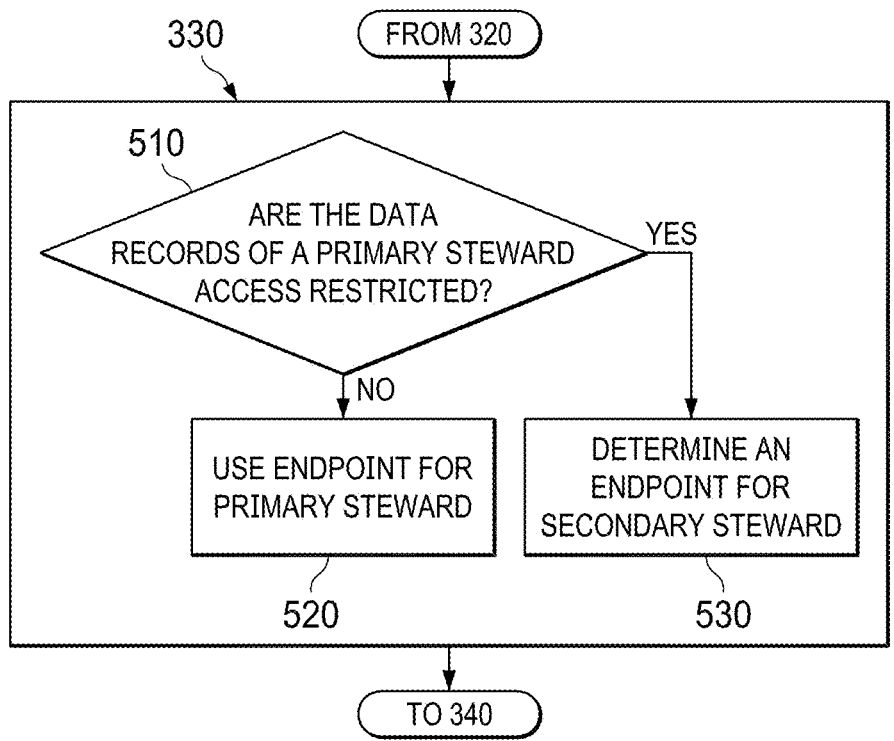
FIG. 5 is a flowchart of another process for determining an endpoint in accordance with an illustrative embodiment.

Turning next to FIG. 5, a flowchart of a process for determining the endpoint for the data steward is depicted in accordance with an illustrative embodiment. The process in FIG. 5 is an example of one manner in which step 330 in FIG. 3 can be implemented.

Continuing from step 320, the process determines whether access to the data records maintained by a primary steward is restricted (step 510). For example, in order to access data records for the first steward, an API may require sensitive data not included in the data of the electronic document.

in response access being restricted, the process determines an endpoint for a second steward that maintains the data records (step 520). Access to the data records maintained by second steward may not require a user's login information, sensitive personal information, or uniquely identifying information. Thereafter, the process continues to step 340 of FIG. 3.

Figure 6:
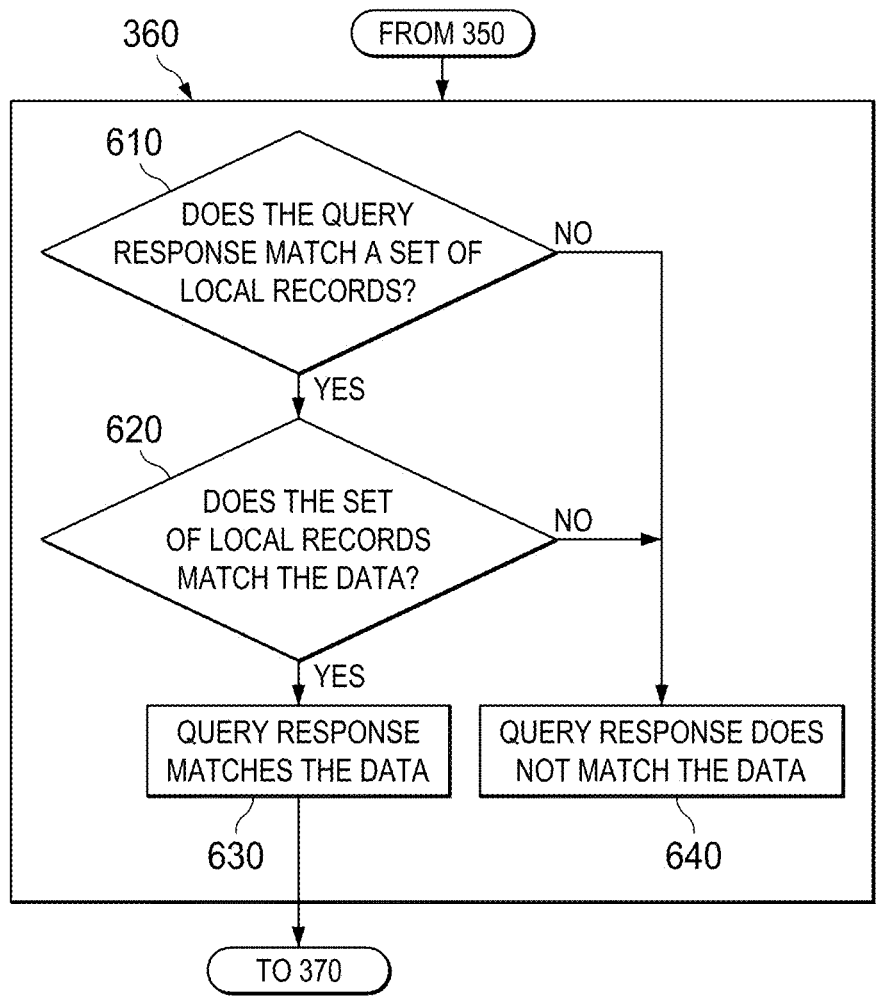
FIG. 6 is a flowchart of a process for determining whether the query response matches data in accordance with an illustrative embodiment.

Turning next to FIG. 6, a flowchart of a process for determining whether the query response matches the data is depicted in accordance with an illustrative embodiment. The process in FIG. 6 is an example of one manner in which step 360 of FIG. 3 can be implemented.

Continuing from step 350, in response to receiving a query response from the secondary steward, the process determines whether the query response matches a set of local records (step 610). In response to determining that the query response matches local records ("yes" at 610), the process determines whether the set of local records matches the data (step 620). In response to determining that the set of local records matches the data ("yes" at 620), The process determines that the query response matches the data (step 630), and proceeds to step 370 of FIG. 3.

However, in response to the process determining either that the query response does not match local records ("no" at 610), or that the set of local records does not match the data ("no" at 620), the query response does not match the data (step 630). The process may thereafter send a notification that corresponding records cannot be located, and the data in the electronic document can therefore not be verified.

Figure 7:
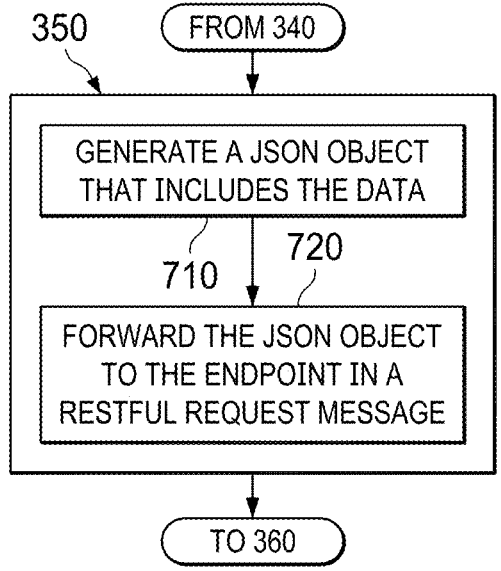
FIG. 7 is a flowchart of a process for gene forwarding the query to the endpoint in accordance with an illustrative embodiment.

Turning next to FIG. 7, a flowchart of a process for forwarding the query to the endpoint is depicted in accordance with an illustrative embodiment. The process in FIG. 7 is an example of one manner in which step 350 in FIG. 3 can be implemented.

Continuing from step 340 in FIG. 3, the process generates a JSON object that includes the data (step 710).

The process forwards the JSON object to the endpoint in a RESTful request message (step 720). Thereafter, the process terminates.

Figure 8:
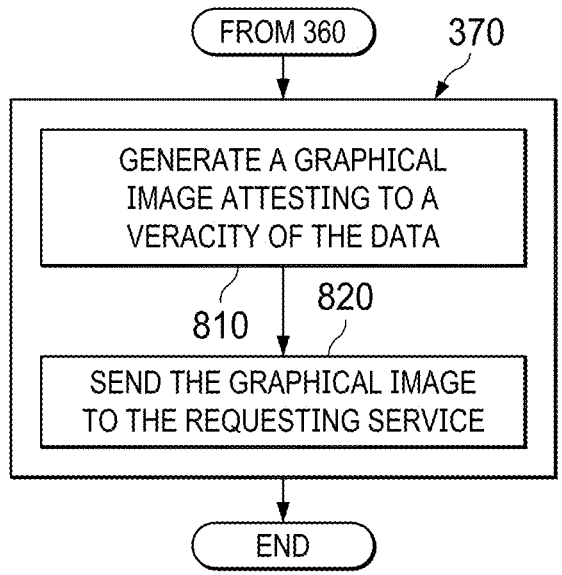
FIG. 8 is a flowchart of a process for sending a verification in accordance with an illustrative embodiment.

Turning next to FIG. 8, a flowchart of a process for sending a verification is depicted in accordance with an illustrative embodiment. The process in FIG. 8 is an example of one manner in which step 370 in FIG. 4 can be implemented.

Continuing from step 360, the process generates a graphical image attesting to a veracity of the data (step 810). The process sends the graphical image to the requesting service (step 820) and terminates thereafter period. The requesting service may display the graphical image in conjunction with the electronic document to provide a visual verification of the data.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a modules, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
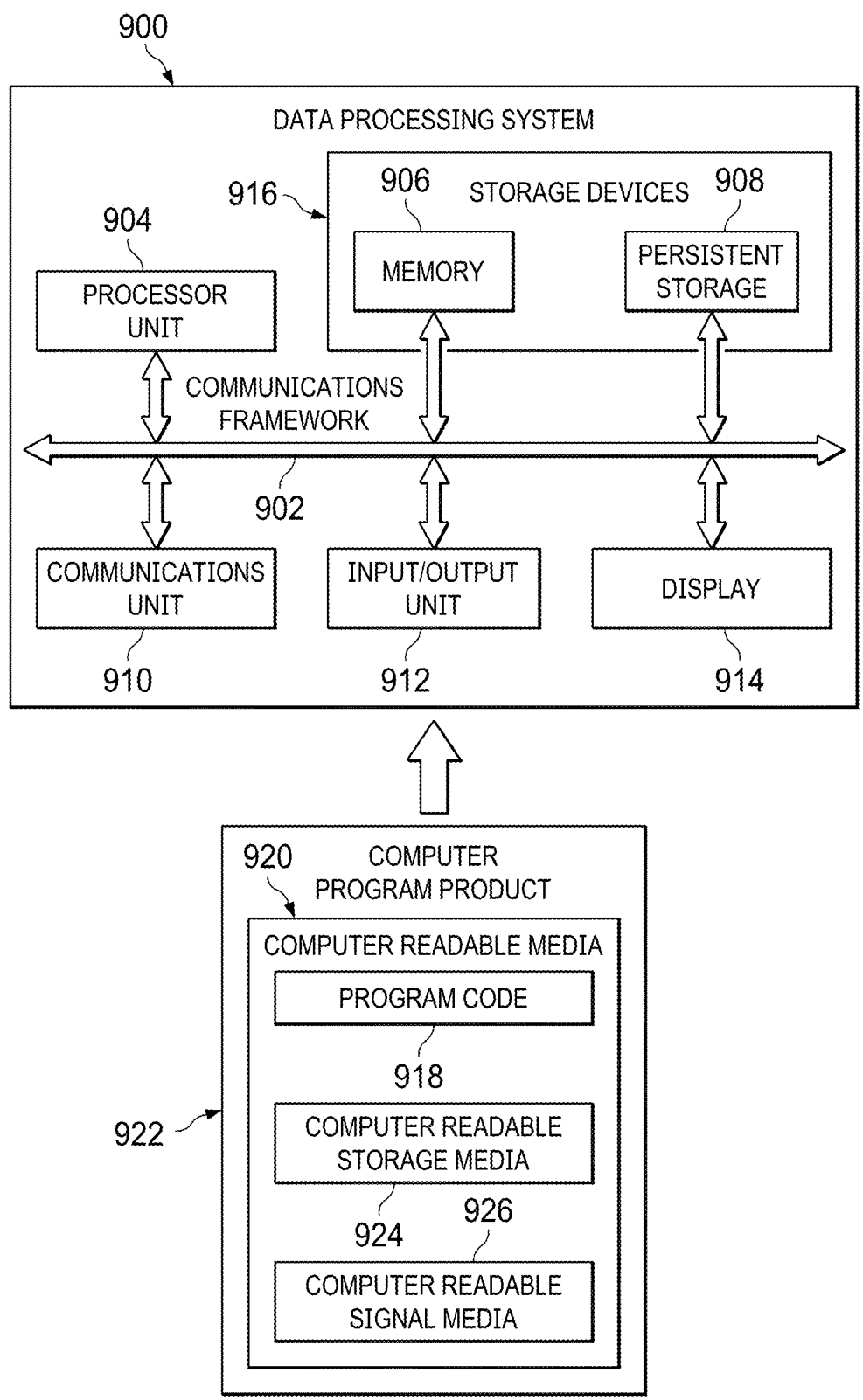
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 204 in FIG. 2.

In this illustrative example, data processing system 900 includes communications framework 902, which provides communications between processor unit 904, memory 906, persistent storage 908, communications unit 910, input/output (I/O) unit 912 and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918. The term "non-transitory" or "tangible," as used herein, is a limitation of the medium itself (i.e., tangible, not a signal) as opposed to a limitation on data storage persistency (e.g., RAM VS. ROM).

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 906, or portions thereof, may be incorporated in processor unit 904 in some illustrative examples.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system, comprising:
   one or more processors, coupled with memory, to:
   receive, via a graphical user interface, a request to verify a license of an electronic document uploaded via an application executed on a client device;
   determine, based on a pattern of characters of a characteristic of the license, an endpoint for a data steward that maintains data records corresponding to the license;
   forward, via an application programming interface compatible with the determined endpoint, a query generated based on the license;
   verify the license based on a comparison between data corresponding to the license and a response from the endpoint to the query; and
   generate, for display, a visual confirmation that the license is verified.

2. The system of claim 1, the one or more processors to:
   determine a format of the pattern of characters of the license, the format including an arrangement of strings within the license;
   identify a rule for determining the endpoint; and
   map, using the rule, the arrangement of strings to the endpoint.

3. The system of claim 1, the one or more processors to:
   determine a set of endpoints by applying one or more rules to the pattern of characters; and
   forward the query to each of the set of endpoints to determine the endpoint.

4. The system of claim 1, the one or more processors to:
   determine that access to the data records maintained by a primary data steward is restricted by the application programming interface based on inclusion of sensitive data within the data corresponding to the license; and
   determine the endpoint for the data steward that is a secondary to the primary data steward, the data steward to maintain the data records based on the inclusion of the sensitive data.

5. The system of claim 1, the one or more processors to:
   verify the license based on a determination that the response matches a set of local records of the data; and
   display on the graphical user interface the visual confirmation corresponding to the set of local records.

6. The system of claim 1, the one or more processors to:
   forward the query to the endpoint by generating a JSON object that includes the data corresponding to the license; and forward the JSON object to the endpoint in a RESTful request message.

7. The system of claim 1, the one or more processors to:
generate the visual confirmation using a graphical image indicative of veracity of the data corresponding to the license; and
display the graphical image in the graphical user interface.

8. The system of claim 1, wherein the electronic document comprises at least one of:
a resume, a job application, an employment history, a position, a job title, an education history, a certification, a credential, a badge, a skill, or an achievement.

9. The system of claim 1, the one or more processors to:
receive the request to verify the data corresponding to the license via a web browser of the application on the client device, and
retrieve, via the web browser, content from a server to display with the visual confirmation on the client device.

10. The system of claim 1, the one or more processors to:
verify the data corresponding to the license based on a match between the data corresponding to the license and the response from the endpoint to the query; and
generate, for display on the client device, the visual confirmation of the match.

11. A method, comprising:
receiving, by one or more processors coupled with memory, via a graphical user interface, a request to verify a certification of an electronic document uploaded via an application executed on a client device;
determining, by the one or more processors based on a pattern of characters of a characteristic of the certification, an endpoint for a data steward that maintains data records corresponding to the data;
forwarding, by the one or more processors via an application programming interface compatible with the determined endpoint, a query generated based on the certification;
verifying, by the one or more processors, the certification based on a match between data corresponding to the certification and a response from the endpoint to the query; and
generating, by the one or more processors, for display, a visual confirmation that the certification is verified.

12. The method of claim 11, comprising:
determining, by the one or more processors, a format of the pattern of characters of the certification, the format including an arrangement of strings within the certification;
identifying a rule for determining the endpoint; and
mapping, by the one or more processors, using the rule, the arrangement of strings to the endpoint.

13. The method of claim 11, comprising:
determining, by the one or more processors, a set of endpoints by applying one or more rules to the pattern of characters; and
forwarding, by the one or more processors, the query to each of the set of endpoints to determine the endpoint.

14. The method of claim 11, comprising:
determining, by the one or more processors, that access to the data records maintained by a primary steward is restricted by the application programming interface based on inclusion of sensitive data within the data corresponding to the certification; and
determining, by the one or more processors, an endpoint for the data steward is secondary to the primary data steward, the data steward maintaining the data records based on the inclusion of the sensitive data.

15. The method of claim 11, comprising:
verifying, by the one or more processors, the certification by determining that the response matches a set of local records of the data; and
displaying, by the one or more processors, on the graphical user interface, the visual confirmation corresponding to the set of local records.

16. The method of claim 11, comprising:
forwarding, by the one or more processors, the query to the endpoint by generating a JSON object that includes the data corresponding to the certification; and
forwarding, by the one or more processors, the JSON object to the endpoint in a RESTful request message.

17. The method of claim 11, comprising:
generating, by the one or more processors, the visual confirmation using a graphical image indicative of veracity of the data corresponding to the certification; and
displaying, by the one or more processors, the graphical image in the graphical user interface.

18. The method of claim 11, wherein the electronic document comprises at least one of:
a resume, a job application, an employment history, a position, a job title, an education history, a credential, a license, a badge, a skill, or an achievement.

19. The method of claim 11, comprising:
receiving, by the one or more processors, the request to verify the data corresponding to the certification from with the graphical user interface of a web browser on the client device; and
retrieving, by the one or more processors, via the web browser, content from a server to display with the visual confirmation on the client device.

20. A non-transitory computer readable media comprising instruction that, when executed by at least one processor, cause the at least one processor to:
receive, via a graphical user interface, a request to verify a credential of an electronic document uploaded via an application executed on a client device;
determine, based on a pattern of characters of a characteristic of the credential, an endpoint for a data steward that maintains data records corresponding to the credential;
forward, via an application programming interface compatible with the determined endpoint, a query generated based on the credential;
verify the credential based on a match between data corresponding to the credential and a response from the endpoint to the query; and
generate, for display, a visual confirmation that the credential is verified.

* * * * *